(12) United States Patent
Kishi et al.

(10) Patent No.: US 10,136,010 B2
(45) Date of Patent: *Nov. 20, 2018

(54) POSITION MEASUREMENT REFERENCE SHEET, IMAGE FORMING APPARATUS, AND IMAGE POSITION MEASUREMENT METHOD

(71) Applicants: Yumiko Kishi, Kanagawa (JP); Makoto Hino, Kanagawa (JP); Satoshi Mohri, Kanagawa (JP); Yoshiaki Morita, Kanagawa (JP); Noritaka Masuda, Kanagawa (JP); Hideyo Makino, Tokyo (JP); Tomoaki Suga, Kanagawa (JP); Takahiro Konishi, Kanagawa (JP); Satoshi Nakayama, Kanagawa (JP)

(72) Inventors: Yumiko Kishi, Kanagawa (JP); Makoto Hino, Kanagawa (JP); Satoshi Mohri, Kanagawa (JP); Yoshiaki Morita, Kanagawa (JP); Noritaka Masuda, Kanagawa (JP); Hideyo Makino, Tokyo (JP); Tomoaki Suga, Kanagawa (JP); Takahiro Konishi, Kanagawa (JP); Satoshi Nakayama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/073,758

(22) Filed: Mar. 18, 2016

(65) Prior Publication Data
US 2016/0277610 A1    Sep. 22, 2016

(30) Foreign Application Priority Data

Mar. 20, 2015  (JP) .................................. 2015-057211
Jul. 29, 2015  (JP) .................................. 2015-149788

(51) Int. Cl.
  *H04N 1/00*  (2006.01)
  *H04N 1/50*  (2006.01)
  *H04N 1/387*  (2006.01)

(52) U.S. Cl.
  CPC ....... *H04N 1/00705* (2013.01); *H04N 1/0032* (2013.01); *H04N 1/00737* (2013.01);
  (Continued)

(58) Field of Classification Search
  None
  See application file for complete search history.

(56) References Cited

U.S. PATENT DOCUMENTS

| | | | | |
|---|---|---|---|---|
| 5,331,380 A | * | 7/1994 | Nasset | G03G 15/605 211/47 |
| 2014/0025443 A1 | * | 1/2014 | Onischuk | G07C 13/00 705/12 |
| 2015/0070732 A1 | * | 3/2015 | Kishi | G03G 15/5062 358/3.27 |

FOREIGN PATENT DOCUMENTS

| | | |
|---|---|---|
| JP | 9-083740 | 3/1997 |
| JP | 2004-349982 | 12/2004 |

(Continued)

*Primary Examiner* — Fan Zhang
(74) *Attorney, Agent, or Firm* — Harness, Dickey & Pierce, P.L.C.

(57) ABSTRACT

A position measurement reference sheet for image position measurement on a recording medium includes a body having a front face to face an image reading face of a reading device, a recording medium detection window in the body to measure a position of an end of the recording medium, and an image detection window in the body to measure a position of an image on the recording medium. The position measurement reference sheet is interposed between the image reading face and the recording medium.

3 Claims, 11 Drawing Sheets

(52) U.S. Cl.
CPC ......... *H04N 1/00795* (2013.01); *H04N 1/387* (2013.01); *H04N 1/50* (2013.01); *H04N 2201/0094* (2013.01)

(56) References Cited

FOREIGN PATENT DOCUMENTS

| | | | |
|---|---|---|---|
| JP | 2006-005487 | 1/2006 | |
| JP | 2006-011285 | 1/2006 | |
| JP | 2008-036840 | 2/2008 | |
| JP | 2009-241464 | 10/2009 | |
| JP | 2012-006349 | 1/2012 | |
| WO | WO 0051017 A2 * | 8/2000 | ........... G06K 9/3216 |

* cited by examiner

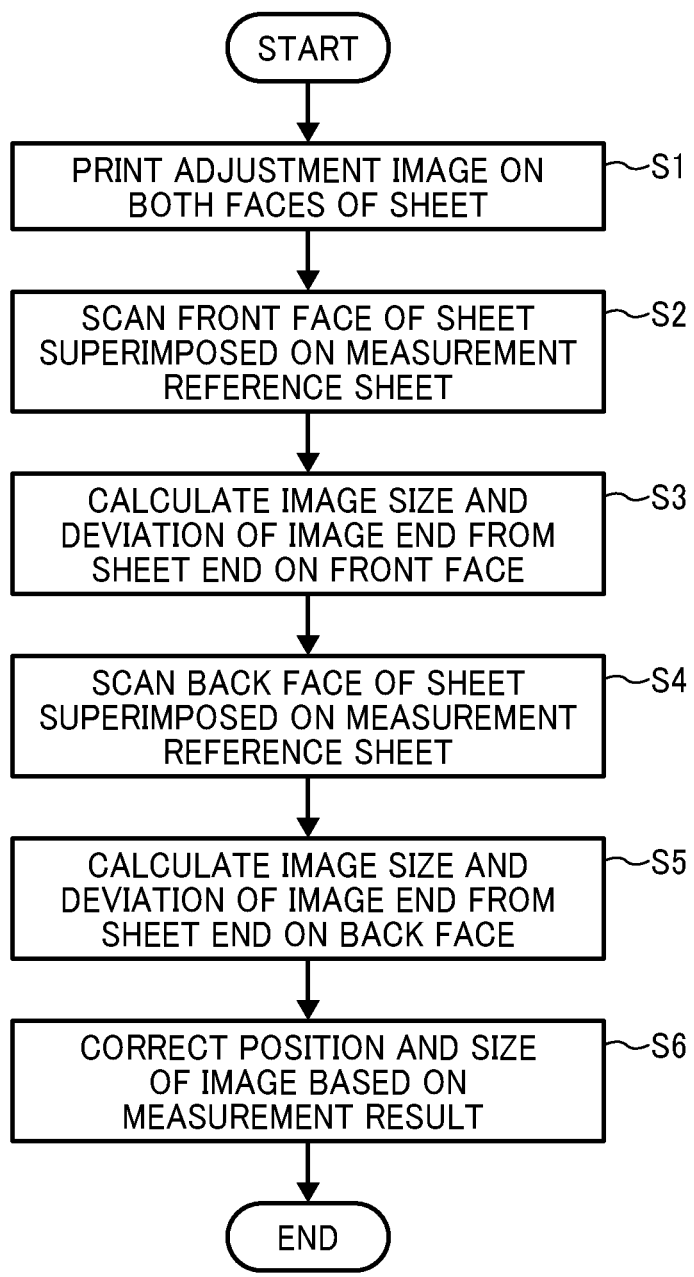

POSITION MEASUREMENT REFERENCE SHEET, IMAGE FORMING APPARATUS, AND IMAGE POSITION MEASUREMENT METHOD

CROSS-REFERENCE TO RELATED APPLICATIONS

This patent application is based on and claims priority pursuant to 35 U.S.C. § 119(a) to Japanese Patent Application Nos. 2015-057211 filed on Mar. 20, 2015 and 2015-149788, filed on Jul. 29, 2015, in the Japan Patent Office, the entire disclosure of each of which is hereby incorporated by reference herein.

BACKGROUND

Technical Field

The present disclosure generally relate to a position measurement reference sheet, an image forming apparatus, such as a copier, a printer, a facsimile machine, and a multifunction peripheral (MFP) having at least two of copying, printing, facsimile transmission, plotting, and scanning capabilities, that adjusts a position of an image using the position measurement reference sheet, and an image position measurement method using the position measurement reference sheet.

Description of the Related Art

In image forming apparatuses, such as copiers, printers, facsimile machines, and MFPs, it is possible that the position of an image on a recording medium (e.g., a sheet of paper) deviates from an intended image position. Therefore, image forming apparatuses typically adjust the image position.

For example, to adjust the image position, an image formed on a recording medium is read with an image reading device (e.g., a scanner) to measure the position of the image relative to the recording medium, and the amount of deviation of the measured image position from an intended image position is calculated to adjust the image position. In such image position adjustment, a point is how to calculate a distance.

For example, the distance may be calculated based on the size of the image relative to an area readable by the scanner. However, it is possible that the size of the area readable by the scanner vary depending on individual differences and accuracy in measurement is degraded by reading errors. For example, in a line-sensor type scanner, errors arise due to uneven feeding speed of a sensor.

SUMMARY

An embodiment of the present invention provides a position measurement reference sheet used in measuring an image position on a recording medium relative to the recording medium. The position measurement reference sheet includes a recording medium detection window to measure a position of an end of the recording medium and an image detection window to measure a position of an image on the recording medium. The position measurement reference sheet is interposed between an image reading face and the recording medium.

In another embodiment, An image forming apparatus includes an image forming device to form an image on a recording medium, a reading device including an image reading face to read the image, and an image position adjuster to adjust the position of the image on the recording medium based on a measurement result obtained by the reading device.

The reading device measures a position of the image on the recording medium relative to the recording medium with reference to the above-described position measurement reference sheet.

In yet another embodiment provides a method for measuring an image position. The method includes placing a position measurement reference sheet on a recording medium bearing an image, the position measurement reference sheet having a plurality of detection windows, reading the position measurement reference sheet and the image on the recording medium from a side of the position measurement reference sheet, and distinguishing densities of the position measurement reference sheet, the recording medium, the image on the recording medium, and a background to measure a position of the image on the recording medium relative to the recording medium.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 23 is a flowchart of a procedure of adjustment of image position and image size on both sides of the sheet, using the position measurement reference sheet according to one of the first through sixth embodiments.

DETAILED DESCRIPTION

Figure 1:
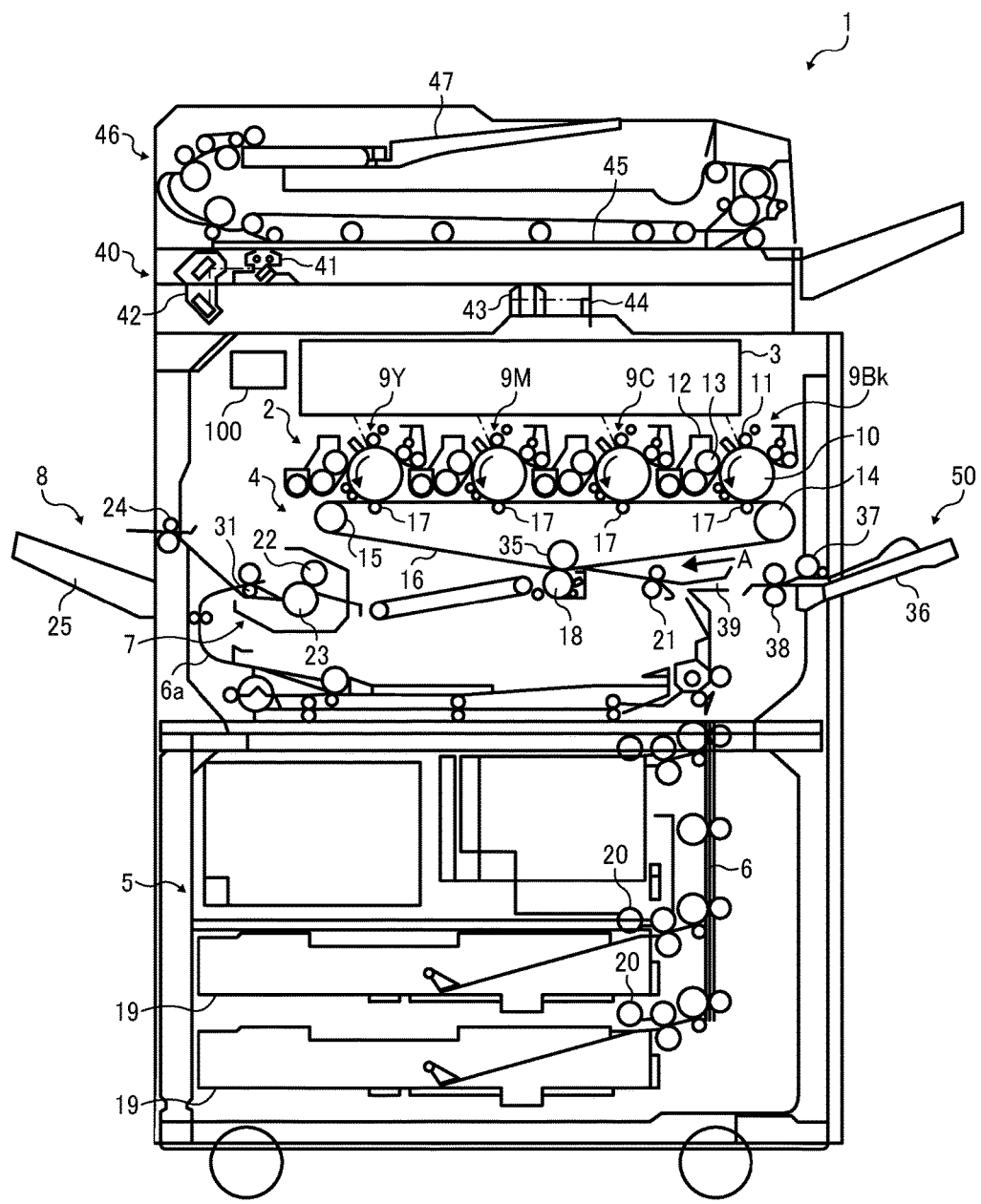
FIG. 1 is a schematic view illustrating an image forming apparatus according to an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, a multicolor image forming apparatus according to an embodiment of the present invention is described.

In FIG. 1, an image forming apparatus 1 includes an image forming section 2 positioned in a center area of the image forming apparatus 1. Four process units 9Y, 9M, 9C, and 9Bk are removably mounted in the image forming section 2. The process units 9Y, 9M, 9C, and 9Bk respectively contain yellow (Y), magenta (M), cyan (C), and black (Bk) developer corresponding to decomposed color components of full-color images and have a similar configuration except the color of developer contained therein.

Each process unit 9 includes a photoconductor drum 10 serving as a rotatable image bearer to bear toner, a charging roller 11 to uniformly charge a surface of the photoconductor drum 10, and a developing device 12, which includes a developing roller 13 to supply toner to the photoconductor drum 10.

An exposure device 3 is disposed above the process units 9. The exposure device 3 emits laser light according to image data.

Below the image forming section 2, a transfer section 4 is disposed. The transfer section 4 includes an endless intermediate transfer belt 16, primary transfer rollers 17, and the like. The endless intermediate transfer belt 16 is rotatably entrained around a driving roller 14, a driven roller 15, and a secondary-transfer opposing roller 35. The primary transfer rollers 17 face, via the intermediate transfer belt 16, the respective photoconductor drums 10 of the process units 9. Each primary transfer roller 17 presses against an inner face of the intermediate transfer belt 16, and a nip between the intermediate transfer belt 16 and the corresponding photoconductor drum 10 is called a primary transfer nip.

Additionally, a secondary transfer roller 18 is disposed facing the secondary-transfer opposing roller 35 via the intermediate transfer belt 16. The secondary transfer roller 18 presses against an outer face of the intermediate transfer belt 16, and a nip therebetween is called a secondary transfer nip.

A sheet feeder 5 is disposed in a lower portion of the image forming apparatus 1. The sheet feeder 5 includes sheet trays 19, which contain sheets P of recording media, and sheet feeding rollers 20 to send out the sheet P from the sheet tray 19.

The image forming apparatus 1 further includes a side sheet feeder 50 (an inserter) separate from the sheet feeder 5. The side sheet feeder 50 includes a sheet tray 36 on which the sheets P are placed, a sheet feeding roller 37 to feed the sheets P into the apparatus, a separation roller 38 to separate one from the sheets P, and a side feeding path 39.

The sheet P sent from either the sheet feeder 5 or the side sheet feeder 50 is transported through a feeding path 6. A registration roller pair 21 and pairs of conveyance rollers are disposed along the feeding path 6 up to a sheet ejection section 8 described later.

The image forming apparatus 1 further includes a fixing device 7, which includes a fixing roller 22 heated by a heat source and a pressure roller 23 that presses against the fixing roller 22.

The sheet ejection section 8 is disposed at extreme downstream in the feeding path 6. The sheet ejection section 8 includes an output roller pair 24 to eject the sheet P outside the apparatus and an output tray 25 to store the output sheet P. The image forming apparatus 1 further includes a divider 31 to divide a sheet conveyance route extending from the fixing device 7 between a route leading to the output roller pair 24 and an inverting path 6a. The inverting path 6a is provided with multiple pairs of conveyance rollers to convey the sheet P.

A scanner 40 is disposed above a body of the image forming apparatus 1 and includes first and second carriages 41 and 42 that travel inside the scanner 40, an imaging forming lens 43 to focus incident light, a reading sensor 44 to read image data, and a scanner glass 45 serving as an image reading face. A document is placed, with an image face faced down, on a reading face of the scanner glass 45.

Above the scanner 40, an automatic document feeder (ADF) 46 is placed. The ADF 46 automatically feeds the document placed on a sheet table 47 to the scanner 40 that reads the image data.

The image forming apparatus 1 further includes a controller 100 serving as an image position adjuster. For example, the controller 100 is a computer including a central processing unit (CPU) and associated memory devices (e.g., ROM, RAM, and the like). The controller 100 executes programs stored in the memory devices to perform various types of control processing. Field programmable gate arrays (FPGA) may be used instead of the CPU. It is to be noted that, the image forming section 2, the exposure device 3, the transfer section 4, and the like together serve as an image forming device.

Referring to FIG. 1, descriptions are given below of operation of the image forming apparatus 1 to copy an image read by the scanner 40, as an example.

Initially, the ADF 46 automatically feeds the document placed on the sheet table 47 to the scanner glass 45, and the scanner 40 reads the image data of the document. Alternatively, in a state in which the ADF 46 is lifted (i.e., opened), the document is placed on the scanner glass 45, and the scanner 40 reads the image data of the document.

Specifically, in the scanner 40, the first and second carriages 41 and 42 travel along the surface of the document. A light source of the first carriage 41 directs light to the document, and the first carriage 41 receives light reflected from the document. From the first carriage 41, the light is reflected to the second carriage 42 and further reflected by a mirror of the second carriage 42. Then, the light passes through the imaging forming lens 43 and enters the reading sensor 44. Thus, the reading sensor 44 obtains the image data of the document.

When the image forming operation is initiated, electrostatic latent images are formed on the respective photoconductor drums 10 of the process units 9Y, 9C, 9M, and 9Bk. Each photoconductor drum 10 is exposed by the exposure device 3 according to single color data, namely, yellow, cyan, magenta, or black color data decomposed from full-color image data to be recorded. The electrostatic latent images on the photoconductor drums 10 are developed into toner images (visible images) with toner supplied by the respective developing rollers 13 of the developing devices 12.

In the transfer section 4, as the driving roller 14 rotates, the intermediate transfer belt 16 rotates in the direction indicated by arrow A in FIG. 1. Transfer voltage, which is opposite in polarity to toner and controlled in either constant voltage control or constant voltage control, is applied to the respective primary transfer rollers 17. Thus, transfer electrical fields are generated in the primary transfer nips, where the toner images are transferred from the respective photoconductor drums 10 and sequentially superimposed one on another on the intermediate transfer belt 16.

Meanwhile, when image formation is initiated, in the sheet feeder 5, the sheet P corresponding to the size of the image date is fed by the corresponding sheet feeding roller 20 from the sheet tray 19 to the feeding path 6. Then, the registration roller pair 21 forwards the sheet P to the secondary transfer nip between the secondary transfer roller 18 and the driving roller 14, timed to coincide with the superimposed toner image on the intermediate transfer belt 16. At that time, transfer voltage opposite in polarity to the toner image on the intermediate transfer belt 16 is applied to the secondary transfer nip, and a transfer electrical field is generated in the secondary transfer nip. The transfer electrical field generated in the secondary transfer nip transfers the toner image from the intermediate transfer belt 16 onto the sheet P at a time.

In the case of sheet feeding from the side sheet feeder 50, the sheet feeding roller 37 feeds the sheets P from the sheet tray 36 into the apparatus. The sheets P are fed to the feeding path 39, separated one by one by the separation roller 38. An end of the feeding path 39 merges with the feeding path 6. The registration roller pair 21 forwards the sheet P fed from the feeding path 39 to the secondary transfer nip, with feeding timing adjusted.

The sheet P carrying the toner image is transported to the fixing device 7, where the toner image is fixed on the sheet P with heat and pressure applied by the fixing roller 22 and the pressure roller 23. Subsequently, the sheet P is separated from the fixing roller 22 and transported by the pair of conveyance rollers. In the sheet ejection section 8, the output roller pair 24 ejects the sheet P to the output tray 25.

In duplex printing, while the sheet P is transported from the fixing device 7 to the sheet ejection section 8, a driving device such as a solenoid rotates the divider 31 to change the conveyance route of the sheet P to the inverting path 6a. Then, the sheet P is transported by the conveyance rollers through the inverting path 6a, tuned upside down, and returned to the feeding path 6. Similar to the front surface, an image is formed on the back side of the sheet P and fixed thereon, after which the sheet P is ejected to the output tray 25.

It is to be noted that, although the description above concerns multicolor (i.e., full-color) image formation, alternatively, single color, bicolor, and three-color images may be formed using one, two, or three out of the four process units 9.

Figure 2:
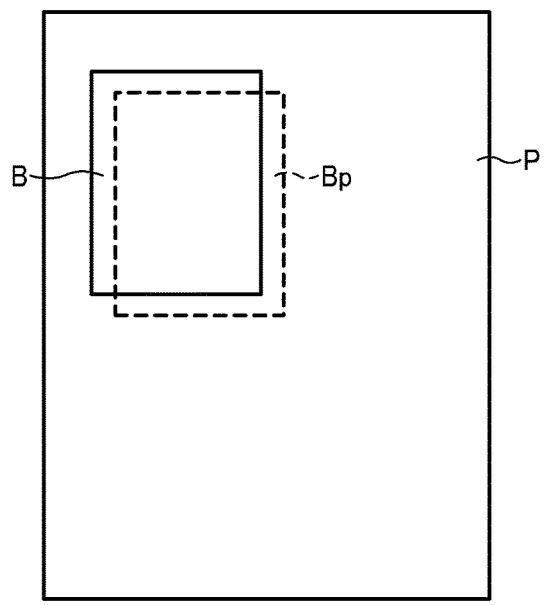
FIG. 2 is a schematic diagram illustrating a positional deviation of an image on a sheet.

In image formation by the image forming apparatus 1 described above, as illustrated in FIG. 2, it is possible that an image B is formed at a position deviated from an intended image position BP on the sheet P. While the sheet P is transported through the feeding paths, it is possible positional deviation, skew, and distortion of the sheet P arise, resulting in the deviation of image position.

It is conceivable that the image B on the sheet P is read with the reading sensor 44 (i.e., a density detector) of the scanner 40, and the amount of deviation of the image B from the intended image position Bp is calculated to correct the deviation of the image position on the sheet P. In this case, it is necessary to determine the position of the image B relative to the sheet P. Therefore, an aspect of this specification concerns a manner of measurement of the position of the image B relative to the sheet P.

The image forming apparatus 1 according to the present embodiment performs image position measurement using a measurement reference sheet. In the image position measurement, relative positions between the measurement reference sheet and the sheet P as well as relative positions between the measurement reference sheet and the image B (i.e., an adjustment image) are measured to determine relative positions between the sheet P and the image B. Accordingly, the deviation amount, the image size, and the like can be calculated. Then, based on the deviation amount thus calculated, the printing position and the like are adjusted.

Descriptions are given below of the measurement reference sheet and an image position measurement method using the measurement reference sheet according to a first embodiment.

Figure 3:
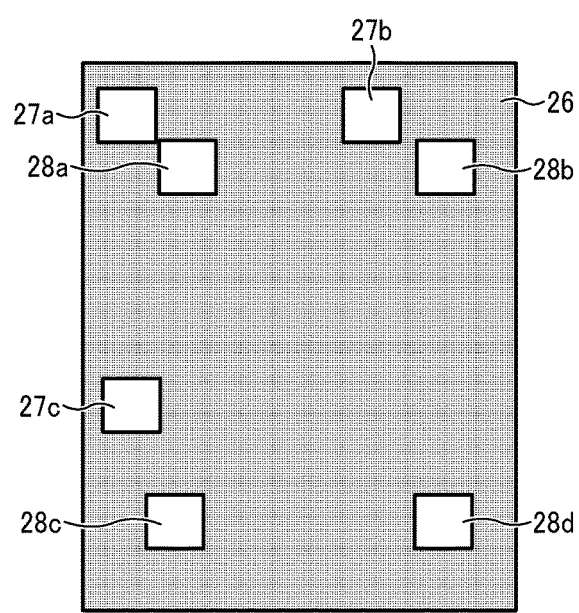
FIG. 3 is a plan view of a measurement reference sheet according to a first embodiment.

In the first embodiment, a measurement reference sheet 26 illustrated in FIG. 3 is used. The measurement reference sheet 26 includes sheet detection windows 27a, 27b, and 27c (also collectively "sheet detection windows 27") to detect the position of an end of the sheet P and image detection windows 28a, 28b, 28c, and 28d (also collectively "image detection windows 28") to detect the position of the image on the sheet P. Relative positions among the sheet detection windows 27 and the image detection windows 28 of the measurement reference sheet 26 are accurately calculated and used to calculate the position of the sheet P and the position of the image on the sheet P.

In the image position measurement according to the present embodiment, the image B for adjustment (hereinafter also "adjustment image B") is printed on the sheet P, and the adjustment image B and the sheet P are disposed with reference to the sheet detection windows 27 and the image detection windows 28. Then the position of the adjustment image B is measured, and the position at which an image is to be formed is adjusted. Accordingly, the adjustment image B has a quadrangular shape and a size such that four corners of the adjustment image B fall inside the image detection windows 28a, 28b, 28c, and 28d, respectively. The adjustment image B is configured to exhibit a density (e.g., darkness, color shade, or gray level) necessary for the image position measurement.

The measurement reference sheet 26 is made of a material having a smaller coefficient of linear expansion to reduce displacement of the sheet detection windows 27 and the image detection windows 28. For example, the measurement reference sheet 26 is a sheet of resin such as polyethylene terephthalate film having a thickness from about 0.1 to about 0.25 mm. Depending on the environment in which the apparatus is used, multiple measurement reference sheets 26 made of different materials can be used.

In the image position measurement, the measurement reference sheet 26 is interposed between the sheet P and the scanner glass 45 serving as the image reading face (i.e., a density measurement face).

Figure 4:
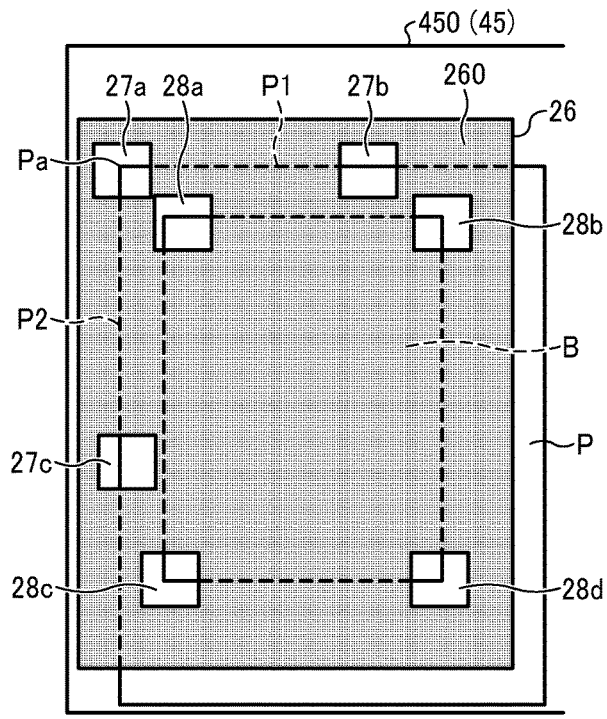
FIG. 4 is a plan view of the measurement reference sheet overlapping with a sheet.

FIG. 4 illustrates the measurement reference sheet 26 overlapping the sheet P as viewed from the side of the scanner glass 45. In FIG. 4, reference character Pa represents a first corner of the sheet P, and P1 and P2 respectively represent ends (end lines) of the sheet P extending in two directions from the first corner Pa. As illustrated in FIG. 4, the measurement reference sheet 26 is disposed relative to the sheet P such that the sheet detection window 27a fully overlaps the first corner Pa of the sheet P, the sheet detection windows 27b and 27c overlap the ends P1 and P2, respectively, and the image detection windows 28a, 28b, 28c, and 28d fully overlap four corners of the adjustment image B, respectively.

To measure the image position, the measurement reference sheet 26 is placed on a reading area 450 of the scanner glass 45, and the sheet P is placed on the measurement reference sheet 26 to satisfy the relative positions described above. Then, the density is measured, with the scanner 40, in each of the sheet detection windows 27 and the image detection windows 28, thereby measuring the position of the sheet P as well as the position of the image B on the sheet P.

Figure 5:
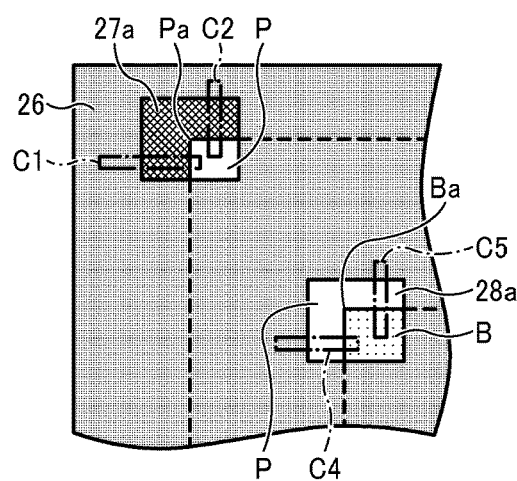
FIG. 5 is a plan view of density measurement areas of the measurement reference sheet.

For example, the density in the sheet detection window 27a is measured in two scanning directions. Specifically, as illustrated in FIG. 5, the density is measured in a lateral area C1 extending laterally in FIG. 5 and a vertical area C2 extending vertically in FIG. 5. In each of the lateral direction (the lateral area C1) and the vertical direction (the vertical area C2), density measurement is performed multiple number of times while a detected position is changed in a direction perpendicular to the measurement direction (i.e., scanning direction). An average of multiple measurement values is used as the measured density. In other words, regarding the lateral area C1, the lateral density measurement is performed multiple times while the detected position is changed little by little in the vertical direction. The density distribution in the lateral direction is obtained by averaging the measurement values. Similarly, regarding the vertical area C2, the vertical density measurement is performed multiple times while the detected position is changed little by little in the lateral direction. The density distribution in the vertical direction is obtained by averaging the measurement values.

Figure 6:
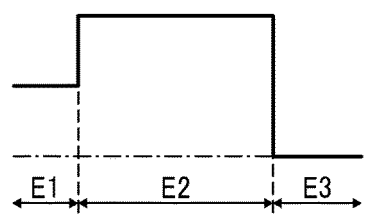
FIG. 6 is a schematic graph of density differences in the density measurement area illustrated in FIG. 5.

FIG. 6 illustrates the density (e.g., gray level) distribution in the lateral direction in the lateral area C1.

The density in the lateral area C1 changes in three steps of, from the left in FIG. 6, a density E1 corresponding to the surface (i.e., a front face 260) of the measurement reference sheet 26, a density E2 corresponding to the sheet detection window 27a (the density of a background, where neither the measurement reference sheet 26 nor the sheet P is present on the scanner glass 45), and a density E3 corresponding to the sheet P. The three densities are distinguishable from each other. By measuring each of the densities, boundary positions can be determined.

For the density measurement according to the present embodiment, scanning is executed with a top (the ADF 46) of the scanner 40 lifted so that the density E2 (background density) corresponding to the sheet detection window 27a is darkest. The density E1 of the surface (front face 260) of the measurement reference sheet 26 is darker than the density E3 of the sheet P and lighter than the density E2 (background density). The front face 260 is disposed facing the scanner glass 45 and opposite the sheet P. For example, the front face 260 of the measurement reference sheet 26 is colored gray to distinguish density boundaries among the measurement reference sheet 26, the background, and the sheet P.

In the above-described manner, based on the density measurement of the lateral area C1, the boundary between the measurement reference sheet 26 and the sheet detection window 27a and the boundary between the sheet detection window 27a and the sheet P in the lateral direction in FIG. 5 are determined. Then, the lateral ends of the sheet P are located relative to the sheet detection window 27a. Similarly, based on the density measurement of the vertical area C2, the boundary between the measurement reference sheet 26 and the sheet detection window 27a and the boundary between the sheet detection window 27a and the sheet P in the vertical direction in FIG. 5 are determined. Then, the top end and the bottom end of the sheet P relative to the sheet detection window 27a are located. Based on the measurement results, the position of the first corner Pa of the sheet P relative to the sheet detection window 27a is determined.

Figure 7:
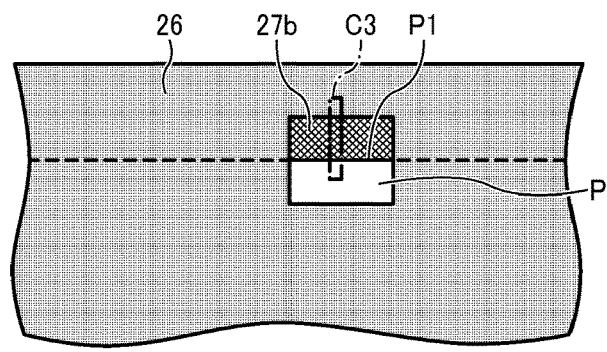
FIG. 7 is a plan view of another density measurement area of the measurement reference sheet.

Additionally, as illustrated in FIG. 7, in the sheet detection window 27b, the density of an area C3 is measured in the vertical direction, and measurement values are averaged to calculate the position of the end P1 (vertical end) of the sheet P in the sheet detection window 27b. Since the relative positions of the sheet detection windows 27a and 27b are known in advance, vertical inclination of the sheet P can be calculated based on the measured position of the first corner Pa of the sheet P in the sheet detection window 27a and the measured position of the end P1 of the sheet P in the sheet detection window 27b. Similarly, the position of the end P2 is calculated based on the measurement in the sheet detection window 27c illustrated in FIG. 4. Based on the position of the end P2 and the calculated position of the first corner Pa in combination, lateral inclination of the sheet P can be calculated. Thus, the position of the sheet P relative to the measurement reference sheet 26 is located.

Figure 8:
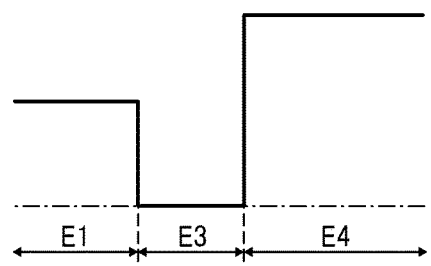
FIG. 8 is a schematic graph of density differences in the density measurement area illustrated in FIG. 7.

Additionally, as illustrated in FIG. 5, density is measured in the image detection window 28a in a similar manner. In a lateral area C4, the density is measured from the left to the right in FIG. 5 to obtain the result (density graph) illustrated in FIG. 8. As illustrated in FIG. 8, a density E4 of the image B on the sheet P is darker (higher) than the density E1 of the measurement reference sheet 26. Accordingly, the density E1 of the measurement reference sheet 26, the density E3 of the sheet P, and the density E4 of the image B are distinguishable from each other to calculate the boundary positions between the image B and the sheet P (outside the image B) in the lateral direction. Alternatively, the density E4 can be a density between the density E1 of the measurement reference sheet 26 and the density E3 of the sheet P.

Then, in a vertical area C5, the density is measured in the vertical direction in FIG. 5 to determine the boundary of the image B on the sheet P in the vertical direction. From the calculation results described above, the position of a first image corner Ba of the image B relative to the image detection window 28a is determined.

Then, density measurement is performed in each of the image detection windows 28b, 28c, and 28d in a similar manner to determine positions of other three corners of the image B relative to the image detection windows 28b, 28c, and 28d, respectively. Thus, the positions of the four corners of the image B relative to the image detection windows 28a, 28b, 28c, and 28d, respectively, are determined to calculate the position and the size of the image B relative to the measurement reference sheet 26.

The measured position of the sheet P relative to the measurement reference sheet 26, obtained from the measurement in the sheet detection windows 27, is combined with the measured position of the image B relative to the measurement reference sheet 26, obtained from the measurement in the image detection windows 28, thereby calculating the position of the image B relative to the sheet P.

According to the measurement reference sheet 26 of the present embodiment, the position of the sheet P relative to the measurement reference sheet 26 is determined by measuring any one (the first corner Pa in the present embodiment) of the corners of the sheet P, a point on one first end line (e.g., the end P1) extending from that corner, and a point on the other end line (e.g., the second end P2) extending from the identical corner in the sheet detection windows 27. Therefore, even when the sheet P is larger than the reading area 450 (illustrated in FIG. 4, a density measurement area) of the scanner 40 and the scanner 40 does not read the entire sheet P at a time, the position and the size of the image B relative to the sheet P are determined by measuring the above-mentioned three points. In a case where the size of the sheet P is unknown (for example, the sheet dimensions differ from those of a specified size due to individual differences or moisture absorption), the position and the size of the image B relative to the sheet P are determined by measuring a portion of the sheet P.

Not only the position of the image B, but also the position of the sheet P relative to the measurement reference sheet 26 is measured to calculate the deviation amount of image position on the sheet P. For example, compared with a method in which the sheet P is disposed at a predetermined position and the positional deviation of the image B is calculated, the present embodiment is advantageous in that the image position measurement is not affected by deviation of the disposed sheet P for each time of measurement.

Next, descriptions are given below of a measurement reference sheet 262 according to a second embodiment.

Figure 9:
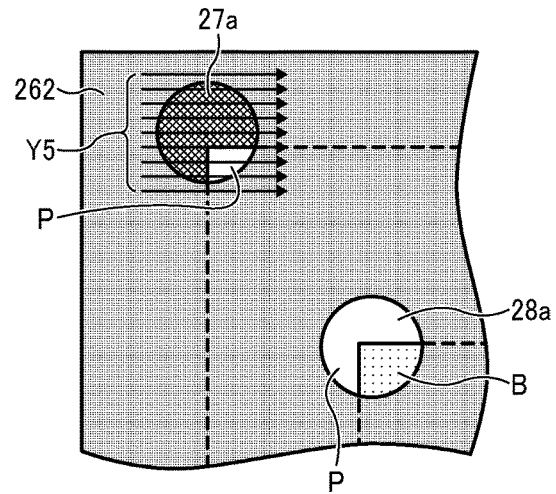
FIG. 9 is a plan view of a measurement reference sheet according to a second embodiment.

As illustrated in FIG. 9, in the measurement reference sheet 262, the sheet detection windows 27 and image detection windows 28 are circular. Placement of the sheet detection windows 27 and the image detection windows 28 is similar to the placement thereof in the first embodiment, and thus only the sheet detection window 27a and the image detection window 28a are illustrated in FIG. 9. Similar to the first embodiment, relative positions of the sheet detection windows 27 and the image detection windows 28 on the measurement reference sheet 262 are accurately calculated and used to calculate the position of the sheet P and the image position on the sheet P.

In the second embodiment, in each of the detection windows, the density is measured in one direction, which is indicated by arrow Y5 in FIG. 9 (hereinafter "direction Y5").

Figure 10:
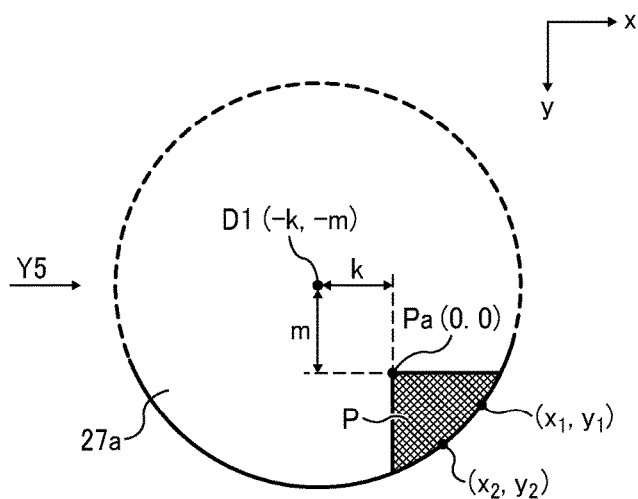
FIG. 10 is a schematic view illustrating an image position measurement method using the measurement reference sheet according to the second embodiment.

For example, in the sheet detection window 27a, the density measurement in the direction Y5 is performed at multiple vertical positions in FIG. 9 to determine the range (hatched in FIG. 10) of the sheet P included in the sheet detection window 27a. At that time, however, the position of the hatched range relative to the sheet detection window 27a is unknown, and the position of the sheet P relative to the sheet detection window 27a is unknown.

In the present embodiment, the controller 100 calculates a position of the hatched range relative to a predetermined position, which in the present embodiment is a center D1 of the sheet detection window 27a. For example, assuming that the first corner Pa of the sheet P is assigned to a coordinate origin (coordinates: 0, 0), coordinates $(x_1, y_1)$ and $(x_2, y_2)$ are assigned to first and second given points on the circumference of the sheet detection window 27a overlapping the sheet P, and coordinates $(-k, -m)$ are assigned to the center D1 of the sheet detection window 27a. A radius of the sheet detection window 27a is represented by R. Since the first and second given positions $(x_1, y_1)$ and $(x_2, y_2)$ are positioned on the circumference having the center D1 and the radius R, values "k" and "m" are obtained using $$(x+k)^2+(y+m)^2=R^2.$$

Specifically, in this formula, "x1" and "x2" are assigned to "x" and "y1" and "y2" are assigned to "y" to obtain two simultaneous equations, and the two simultaneous equations are solved to obtain the values k and m. Thus, the coordinates of the center D1 of the sheet detection windows 27 are obtained. Accordingly, the position of the first corner Pa of the sheet P relative to the sheet detection window 27a is calculated based on the density measurement in one scanning direction.

Figure 11:
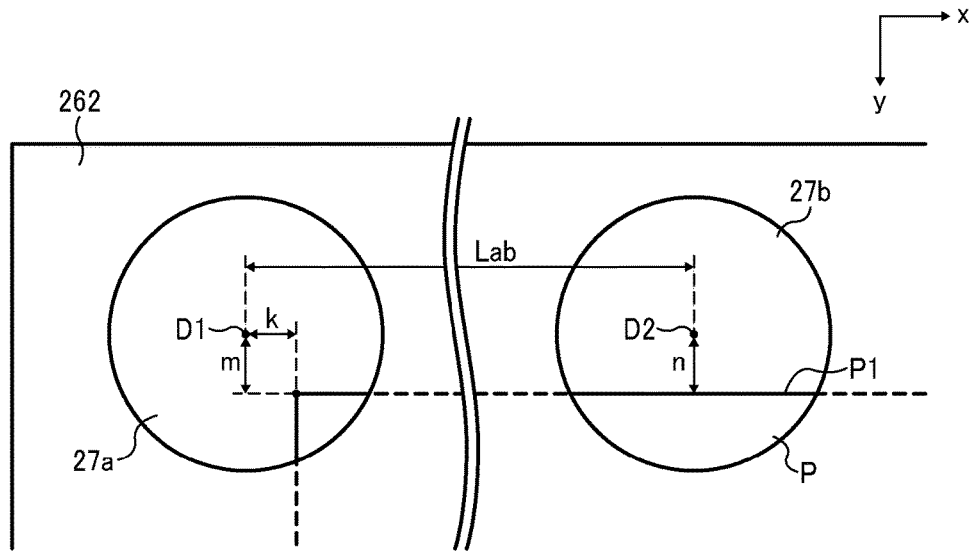
FIG. 11 is another schematic view illustrating the image position measurement method using the measurement reference sheet according to the second embodiment.

As illustrated in FIG. 11, the densities in the sheet detection window 27b are measured in the vertical direction in FIG. 11 as well to obtain an altitude n from a center D2 of the sheet detection window 27b to the end P1. For example, an area including the center D2 and extending vertically in FIG. 11 is scanned to directly obtain the altitude n. From a lateral distance Lab between the center D1 of the sheet detection window 27a and the center D2 of the sheet detection window 27b and the altitude n, vertical inclination of the sheet P relative to the measurement reference sheet 262 is obtained. In a similar manner, lateral inclination of the sheet P relative to the measurement reference sheet 262 is obtained in relation to the sheet detection window 27c. Thus, the position of the sheet P relative to the measurement reference sheet 262 is obtained.

Next, descriptions are given below of calculation of the position and the size of the image B based on the coordinates of the four corners of the image B with reference to FIG. 12.

The density measurement in one direction is executed in each of the image detection windows 28a, 28b, 28c, and 28d, and the amount of positional deviation between the four corners of the image B and centers Da, Db, Dc, and Dd (centers of circles) of the image detection windows 28a, 28b, 28c, and 28d are measured. The manner is similar to the calculation of "k" and "m" of the sheet detection window 27a, and thus redundant descriptions are omitted. It is to be noted that, for ease of understanding, the image B is illustrated in a larger size in FIG. 12.

Figure 12:
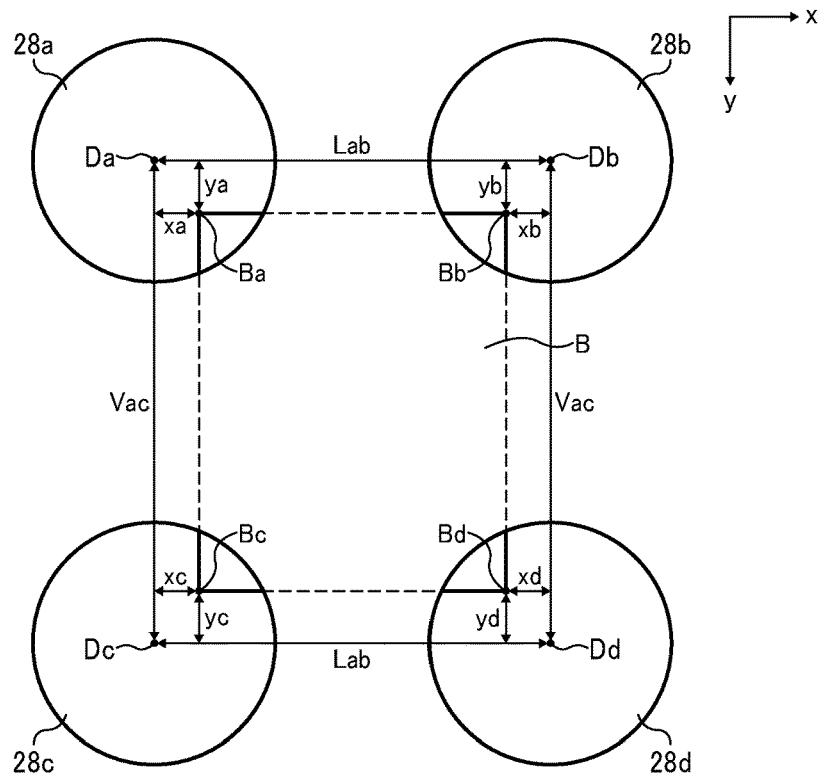
FIG. 12 is another schematic view illustrating the image position measurement method using the measurement reference sheet according to the second embodiment.
Figure 13:
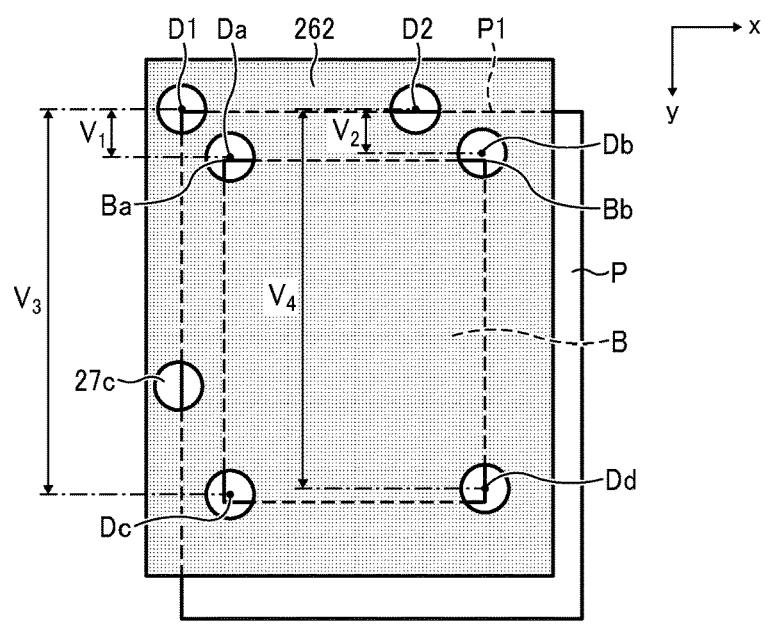
FIG. 13 is another schematic view illustrating the image position measurement method using the measurement reference sheet according to the second embodiment.

In FIG. 12, reference characters Ba, Bb, Bc, and Bd respectively represent the first, second, third, and fourth image corners of the image B, and xa and ya respectively represent deviation amounts from the center Da to the first image corner Ba in X and y directions. Similarly, xb and yb represent deviation amounts from the center Db to the second image corner Bb, xc and yc represent deviation amounts from the center Dc to the third image corner Bc, and xd, and yd respectively represent deviation amounts from the center Dd to the fourth image corner Bd.

The image detection windows 28 are disposed so that the centers Da, Db, Dc, and Dd form a quadrangle. In other words, in y direction, the centers Da and Db are disposed at an identical position, and the centers Dc and Dd are disposed at an identical position. Similarly, in x direction, the centers Da and Dc are disposed at an identical position, and the centers Db and Dd are disposed at an identical position.

The lateral distance between the centers Da and Db and the lateral distance between the centers Dc and Dd are represented by Lab, and the vertical distance between the centers Da and Dc and the vertical distance between the centers Db and Dd are represented by Vac.

For example, assuming that the center Da is assigned to the coordinate origin (coordinates: 0, 0), the first image corner Ba is at coordinates (xa, ya), the second image corner Bb is at coordinates (Lab-xb, yb), the third image corner Bc is at coordinates (xc, Vac-yc), and the fourth image corner Bd is at coordinates (Lab-xd, Vac-yd). The area of the image B is calculated using the above-described three points.

Thus, the positions of the four corners of the image B relative to the center Da of the image detection window 28*a* are determined, and the position of the image B relative to the measurement reference sheet 262 is determined. Additionally, in combination with the measured position of the sheet P relative to the measurement reference sheet 262, the position of the image B relative to the sheet P is determined. Then, the position of the image B to be formed on the sheet P can be adjusted.

The position and the size of the image B can be calculated more simply as follows. Calculate, as a lateral length (i.e., width) of the image B, an average of a length (Lab-xa-xb) between the first image corner Ba and the second image corner Bb in x direction and a length (Lab-xc-xd) between the third image corner Bc and the fourth image corner Bd. Calculate, as a vertical length of the image B, an average of a length (Vab-ya-yc) between the first image corner Ba and the third image corner Bc in y direction and a length (Vac-yb-yd) between the second image corner Bb and the fourth image corner Bd. Multiply the lateral length with the vertical length to obtain an approximate area of the image. B.

Additionally, the position of the image B relative to the sheet P can be calculated as follows. To simplify the description, initially, calculation of the four corners in y direction are described.

Assuming that the deviations from the centers D1 and D2 of the sheet P in y direction are calculated as "k" and "in" as described above with reference to FIG. 11, an approximate deviation of the end P1 of the sheet P from the centers D1 and D2 in y direction is calculated as (m+n)/2. When $V_1$ represents an altitude from the center D1 of the sheet detection window 27*a* to the center Da and the center Db of the image detection windows 28*a* and 28*b*, and $V_2$ represents an altitude from the center D2 of the sheet detection window 27*b* to the center Da and the center Db of the image detection windows 28*a* and 28*b*, an altitude from the end P1 of the sheet P to the first image corner Ba is expressed as (distance between *D*1 and *Da*)−(distance between *D*1 to *P*1)+(distance between *Da* and *Ba*)=$V_1$− (*m*+*n*)/2+*ya*.

An altitude from the end P1 of the sheet P to the second image corner Bb is expressed as $V_2-(m+n)/2+yb$.

Since the positions of the sheet detection windows 27 and the image detection windows 28 are accurately calculated in advance, the altitudes $V_1$ and $V_2$ are known. Accordingly, the distances from the end P1 of the sheet P to the first and second image corners Ba and Bb are obtained.

Similarly, when $V_3$ represents an altitude from the center D1 of the sheet detection window 27*a* to the center Dc and the center Dd of the image detection windows 28*c* and 28*d*, and $V_4$ represents an altitude from the center D2 of the sheet detection window 27*b* to the center Dc and the center Dd of the image detection windows 28*c* and 28*d*, an altitude from the end P1 of the sheet P to the third image corner Bc is expressed as $V_3-(m+n)/2+yc$.

An altitude from the end P1 of the sheet P to the fourth image corner Bd is expressed as $V_4-(m+n)/2+yd$.

Since the altitudes $V_3$ and $V_4$ are known, the distances from the end P1 of the sheet P to the third and fourth image corners Bc and Bd are obtained.

Thus, the altitudes from the end P1 of the sheet P to the four corners of the image B are obtained. In a similar manner, lateral distances from the end of the sheet P to the four corners of the image B are obtained.

Further, since the relative positions of the end of the sheet P and the measurement reference sheet 262 are known as described above, the relative positions of the measurement reference sheet 262, the sheet P, and the image B can be calculated to adjust the position of the image B on the sheet P.

As described above, in the second embodiment, since the position measurement reference sheet has the circular sheet detection windows 27 and the circular image detection windows 28, the relative positions of the center of the circle (i.e., center of gravity) and the sheet P (or the image B) can be calculated based on density measurement in only one scanning direction. Based on the calculated relative positions of the center of gravity and the sheet P (or the image B), the controller 100 determines the relative positions of the sheet P and the image B as well as the size of the image B.

In the above-described embodiments, scanning is executed with the top of the scanner 40 open to achieve a highest density (density E2 in FIG. 6) in a portion of the sheet detection window 27*a* where no sheet P is present, thereby providing the difference in density with the sheet P and with the measurement reference sheet 262. In the scanning in which the top of the scanner 40 is open, however, it is possible that a shadow of an operator or the top of the scanner 40 is reflected in the density measurement, resulting in defective detection.

Figure 14:
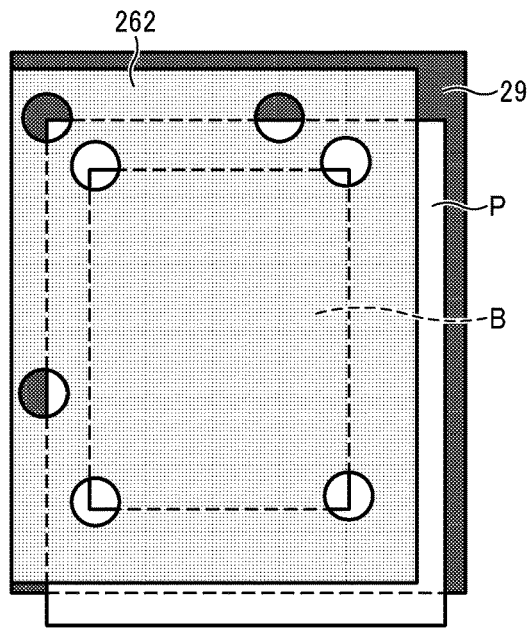
FIG. 14 is a plan view of a measurement reference sheet according to a third embodiment.

In view of the foregoing, FIG. 14 illustrates a measurement reference sheet according to a third embodiment, which is designed for image position measurement in a state in which the top of the scanner 40 is closed.

In the third embodiment, a liner 29 is disposed on the back (i.e., opposite the front face 260 facing the scanner glass 45) of the measurement reference sheet 262 as illustrated in FIG. 14. In the density measurement, the sheet P is interposed between the measurement reference sheet 262 and the liner 29. The liner 29 is a thin sheet similar to the measurement reference sheet 262.

With the liner 29, in a portion of the sheet detection windows 27 where the sheet P is not present, the density of a front side (facing the scanner glass 45) of the liner 29 is measured. The liner 29 has a color to exhibit a density (e.g., gray level) different from the density of the sheet P and that of the measurement reference sheet 262 to distinguish the boundaries of the liner 29, the sheet P, and the measurement reference sheet 262. For example, to distinguish the density among the liner 29, the sheet P, and the measurement reference sheet 262, the density of the liner 29 is darker than the density of the sheet P and lighter than the density of the measurement reference sheet 262. Alternatively, the liner 29 is darkest among the three.

Use of the measurement reference sheet 262 according to the third embodiment is advantageous in that, even if the scanning is executed with the top of the scanner 40 closed, the density (background density in the first embodiment), the density of the sheet detection windows 27 where the sheet P is not present is distinguishable from the density of the sheet P or the density of the measurement reference sheet 262. Accordingly, the image position can be measured with the top of the scanner 40 closed.

Figure 15:
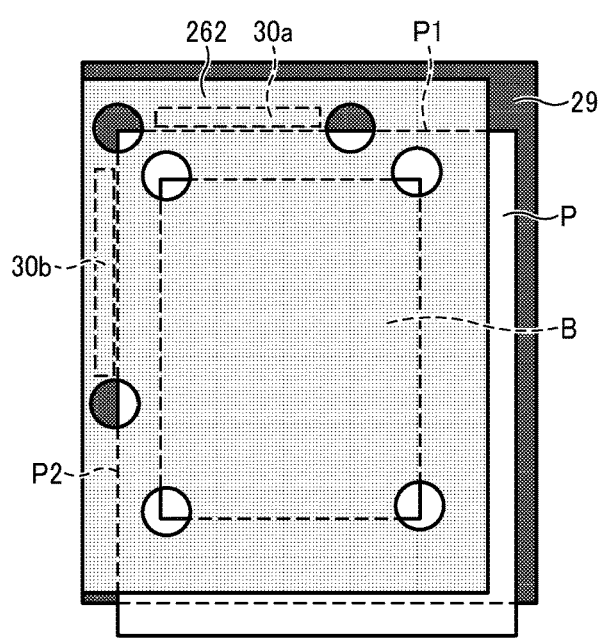
FIG. 15 is a plan view of a measurement reference sheet according to a fourth embodiment.

FIG. 15 illustrates a measurement reference sheet according to a fourth embodiment. As illustrated in FIG. 15, in the fourth embodiment, the liner 29 is attached to (a body of) the measurement reference sheet 262 via binders 30a and 30b. The binders 30a and 30b are disposed such that, in the density measurement, the ends P1 and P2 of the sheet P being interposed between the measurement reference sheet 26 and the liner 29 abut (or contact) the connectors 30a and 30b, thereby aligning the sheet P. For example, the hinders 30a and 30h are made of double-sided adhesive tape so that the liner 29 is secured to the measurement reference sheet 262 at the ends P1 and P2 of the sheet P.

With the binders 30a and 30b disposed as described above, in setting the sheet P between the measurement reference sheet 262 and the liner 29, the sheet P is inserted until the ends P1 and P2 contact the binders 30a and 30b, respectively, thereby aligning the sheet P for the density measurement.

As described above, in the fourth embodiment, the sheet P is placed at a predetermined position at each density measurement to reduce measurement errors. In particular, a portion of each of the hinders 30a and 30b that contacts the end P1 or P2 is parallel to the side face of the measurement reference sheet 262 and the like so that the sheet P is placed parallel to the measurement reference sheet 262. Accordingly, measurement errors can be smaller.

Thus, in the fourth embodiment, with the binders 30a and 30b to contact the ends P1 and P2 of the sheet P, the position of the sheet P relative to the measurement reference sheet 262 is stable. Providing the binders 30a and 30b as additional components, however, increases the cost. It is possible that when double-sided adhesive tape is used to bond the liner 29 to the measurement reference sheet 262, separation of the liner 29 is difficult. There is a risk that dimensional tolerance or error accumulates and measurement error increases as the number of components increases.

Figure 16:
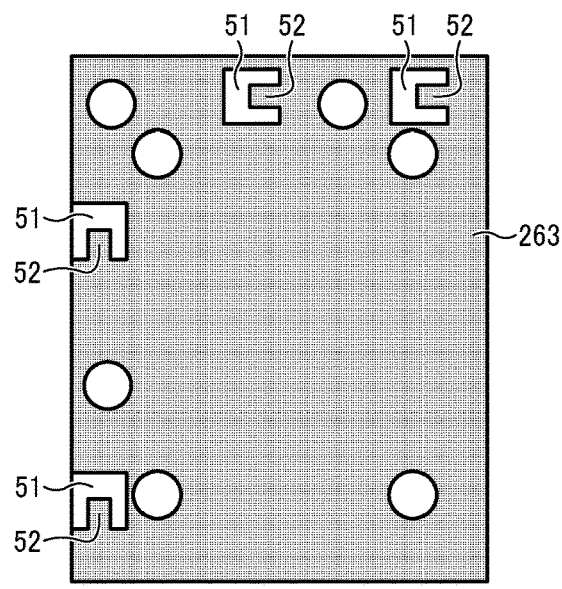
FIG. 16 is a plan view of a measurement reference sheet according to a fifth embodiment.

In view of the foregoing, FIG. 16 illustrates a position measurement reference sheet 263 according to a fifth embodiment, which has multiple insertion clearances 51. Each insertion clearance 51 is U-shaped, and an insertion 52 projects to an inner side of the insertion clearance 51. The insertion 52 serves as a binder.

The insertion 52 is a projection having a first end (i.e., a base end) continuous with or attached to the measurement reference sheet 263 and a free second end. In the fifth embodiment, the measurement reference sheet 263 is made of a thin polyethylene terephthalate (PET) film and flexible. Accordingly, the insertion 52 is flexible as well. The free second end of the insertion 52 is deformable from the base end continuous with or attached to the measurement reference sheet 263.

Figure 17:
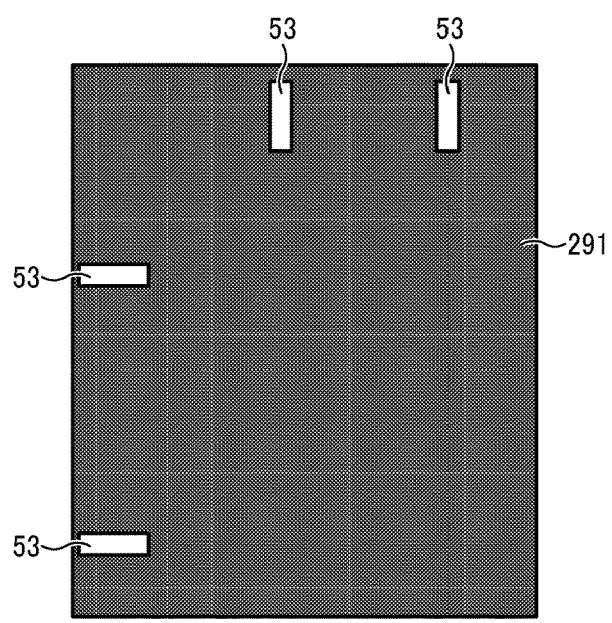
FIG. 17 is a plan view of a liner according to the fifth embodiment.

Additionally, as illustrated in FIG. 17, a liner 291 includes insertion holes 53 (i.e., engagement portions) disposed to fit the insertions 52 of the measurement reference sheet 263, respectively. The insertion hole 53 is wider than the insertion 52 (i.e., in a longitudinal direction in FIG. 17 or the direction perpendicular to the direction of insertion of the insertion 52) so that the insertion 52 is inserted into the insertion hole 53.

Figure 18:
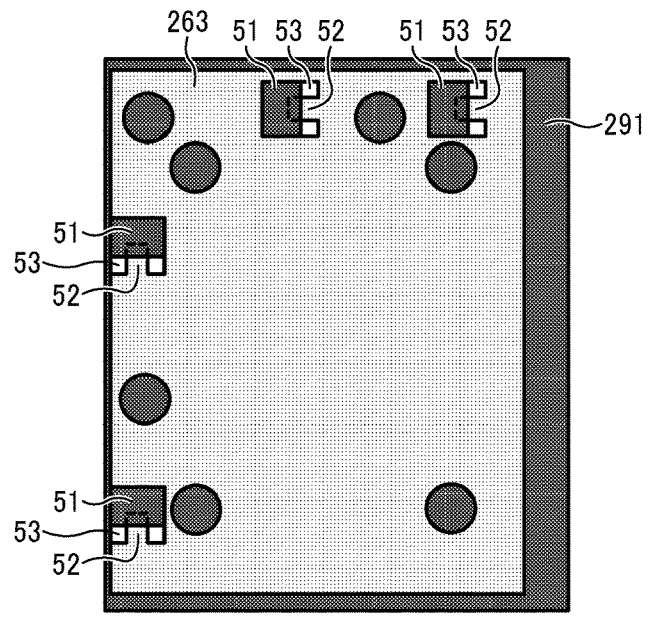
FIG. 18 is a plan view of the measurement reference sheet, to which the liner is attached.

The insertion 52 is deformed toward the liner 291 to enter the insertion hole 53 as illustrated in FIG. 18. Then, the liner 291 is secured to the measurement reference sheet 263.

Figure 19:
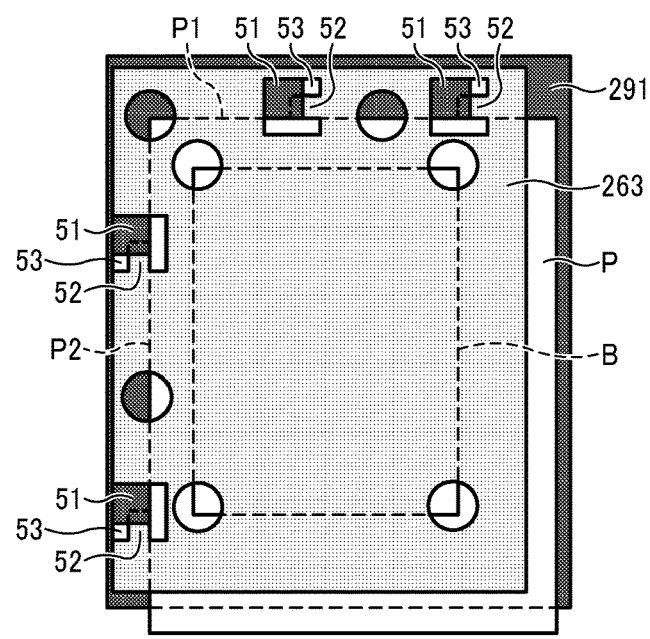
FIG. 19 is a plan view of a state in which sheet is interposed between the measurement reference sheet and the liner.

Subsequently, as illustrated in FIG. 19, the end lines P1 and P2 of the sheet P are disposed in contact with an end (short side end in FIG. 19) of each insertion 52 so that the sheet P being interposed between the measurement reference sheet 263 and the liner 291 is placed at the predetermined position.

As described above, in the fifth embodiment, the liner 291 is connected to the measurement reference sheet 263 without providing a separate component as a binder, bonding with double-sided adhesive tape, or processing such as clamp binding. Accordingly, the cost of the measurement reference sheet 263 is reduced. Although tolerance is accumulated when a separate component is used, such disadvantage is prevented. When the sheet detection windows 27 and the image detection windows 28 are produced by perforation, the insertion clearances 51 can be produced simultaneously. Then, it is not necessary to execute a separate process for the insertion clearances 51, and the cost can be smaller.

Additionally, the measurement reference sheet 263 and the liner 291 separable from each other is advantageous. In accordance with the sheet size, an optimum one can be selected from multiple measurement reference sheets different in size or type and combined with the liner 291.

For example, when the sheet P is colored white, as an example combination, the measurement reference sheet 263 is gray and the liner 291 is black. When the sheet P is colored black, as an example combination, the measurement reference sheet 263 is gray and the liner 291 is white. Thus, the combination of the measurement reference sheet 263 and the liner 291 is changed in accordance with the color of the sheet P.

Additionally, when the front face 260 (detected face) and the back side of at least one of the measurement reference sheet 263 and the liner 291 have different colors (different in darkness, density, or shade), the different side can be used in accordance with the color of the sheet P. For example, in a combination in which the front side and the back side of the measurement reference sheet 263 are gray, the front side of the liner 291 is black, and the back side of the liner 291 is white, when the sheet P is white, the front sides of the measurement reference sheet 263 and the liner 291 are used. When the sheet P is black, the back sides of the measurement reference sheet 263 and the liner 291 are used. In this case, a wide variety of sheet types can be covered even when there are not many types of the measurement reference sheets 26 and the liners 291.

Although coloration of the liner 291 is changed in the description above, alternatively, coloration of the measurement reference sheet 263 or coloration of both of the liner 291 and the measurement reference sheet 263 can be changed.

Figure 20A:
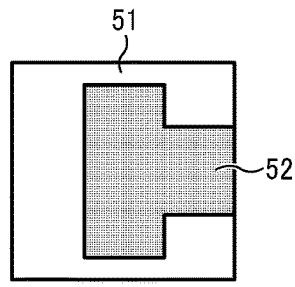
FIGS. 20A and 20B illustrate insertions according to variations of the fifth embodiment.
Figure 20B:
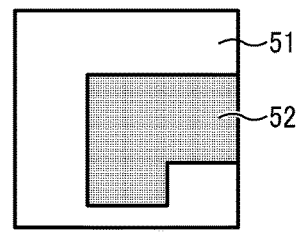

It is to be noted that the shape of the insertion 52 is not limited to rectangles. For example, the insertion 52 can be shaped like a letter "T" or "L" as illustrated in FIGS. 20A and 20B. In these cases, compared with the rectangular insertion 52, the insertion 52 is less likely to come out from the insertion hole 53 in a state illustrated in FIG. 18.

Figure 21:
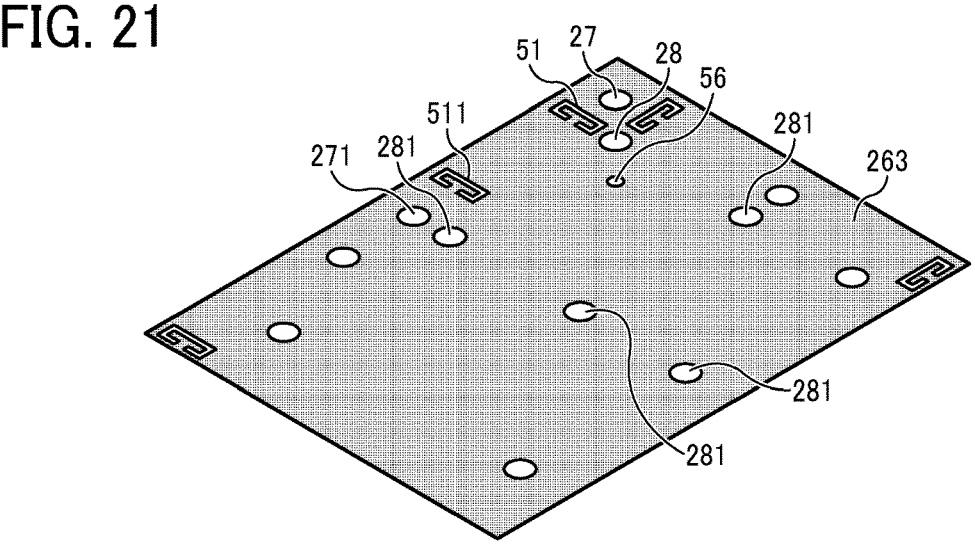
FIG. 21 is a perspective view of a position measurement reference sheet according to another variation of the fifth embodiment, which corresponds to multiple different sheet sizes.

Additionally, in the measurement reference sheet 263, a greater number of detection windows can be formed corresponding to different sheet sizes. For example, as illustrated in FIG. 21, in addition to the sheet detection windows 27, the image detection windows 28, and the insertion clearances 51 for a large sheet size, sheet detection windows 271, image detection windows 281, and insertion clearances 511 for a small sheet size are formed. Yet additionally, the measurement reference sheet 263 further include a window 56 to check the color of the image formed on the sheet P.

Figure 22:
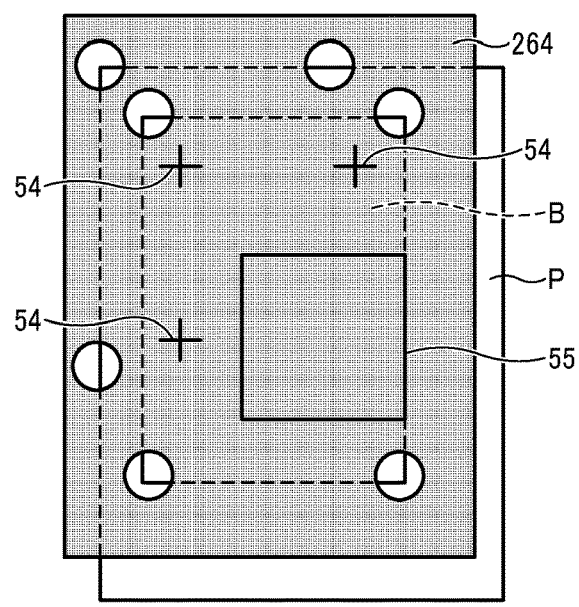
FIG. 22 is a plan view of a measurement reference sheet according to a sixth embodiment.

FIG. 22 illustrates a position measurement reference sheet 264 according to a sixth embodiment, which has reading references 54 and reading reference data 55.

For example, each reading reference 54 is a cross mark on the measurement reference sheet 264, and the positions and the dimensions of the reading references 54 are accurately measured in advance. Although the reading reference 54 is cross marks in FIG. 22, alternatively, reading references 54 include at least one of a line and a dot. Yet alternatively, a reference window or hole can be made at a specific position on the measurement reference sheet 264. For example, one of the image detection windows 28 and the sheet detection windows 27 can be used as the reading reference.

The reading reference data 55 is coded in a standardized form readable by the reading sensor 44 (illustrated in FIG. 1). For example, one-dimensional codes such as bar codes and two-dimensional codes such as quick response (QR) code (registered trademark) are used. The reading reference data 55 includes the dimensions of the reading references 54, the positions of the reading references 54 on the measurement reference sheet 264, and an ideal position of the adjustment image B on the sheet P, which are coded.

In the present embodiment, in reading the position of the sheet P overlapping with the measurement reference sheet 264 and the position of the adjustment image B, simultaneously, the reading sensor 44 can read the dimensions of the reading references 54, the positions of the reading references 54 on the measurement reference sheet 264, and an ideal position of the adjustment image B on the sheet P, which are coded in the reading reference data 55. Disposing three reading references 54 are advantageous in that the position of the sheet P is read accurately at that time. The positions of the sheet end and the image B relative to the measurement reference sheet 264 can be measured with reference only to the image detection windows 28 and the sheet detection windows 27 as described in the first and second embodiments. However, when the references are holes (i.e., the detection windows), since the sheet P has a thickness, a shadow is casted in a thickness portion of the sheet P, which is the boundary between the hole and the background on the back of the hole. Then, it is difficult to measure the boundary position with the hole on the measurement reference sheet 264. Therefore, the reading references 54 enable more accurate measurement.

Additionally, since the reading sensor 44 can read the data prestored as the reading reference data 55, for example, even when the operator does not know the ideal position of the image B on the sheet P, the image position adjustment can be made based on the reading reference data 55 read by the reading sensor 44.

FIG. 23 is a flowchart of a procedure to adjust the image position and image size in duplex printing, using one of the position measurement reference sheets 26, 162, 263, and 264 (collectively represented by "position measurement reference sheet 26") according to the above-described embodiments.

At S1, the image forming apparatus 1 prints the adjustment image B on both sides of the sheet P. The measurement reference sheet 26 is placed on the reading area 450 of the scanner glass 45 (illustrated in FIG. 1), and the sheet P is disposed at the predetermined position for the measurement on the measurement reference sheet 26 with the front side of the sheet P facing the scanner glass 45. In this state, at S2, the reading sensor 44 scans the sheet P, and the size of the image B and the deviation of the end of the image B from the end of the sheet P are calculated at S3.

At that time, in the sixth embodiment, the reading sensor 44 reads the reading reference data 55 to obtain the ideal position of the adjustment image B. Additionally, the reading sensor 44 reads, from the reading reference data 55, the preset dimensions of the reading references 54 and the preset positions of the reading references 54 on the measurement reference sheet 26. By reading the actual positions of the reading references 54 simultaneously, the reading sensor 44 can read the placement of the measurement reference sheet 26.

At S4 and S5, the sheet P is turned upside down, the reading sensor 44 scans the sheet P, and the size of the image B and the deviation are calculated similar to the steps S2 and S3. Based on the measurement results obtained above, at S6, the controller 100 can adjust the image formation start position or changes magnification of the image to be formed to adjust the sizes and positions of the images formed on the front side and the back side of the sheet P.

In the image position measurement using the position measurement reference sheet according to any one of the first through sixth embodiments, in the image detection window, the density of the image is detected in a portion where the image overlaps the image detection window, and the density of the surface of the recording medium is detected in a portion without the image. Additionally, in the sheet detection window, the density of the surface of the sheet is detected in a portion where the sheet is present, and the density of the background (the image reading face) is detected in a portion where the sheet is not present. In the area other than the detection windows, the density of the position measurement reference sheet is detected.

Thus, by distinguishing image density among the sheet, the image, the position measurement reference sheet, and the background, the boundaries of the sheet, the image, and the position measurement reference sheet in the respective detection windows are distinguishable. Additionally, since the sheet position and the image position relative to the respective detection windows of the position measurement reference sheet are measured, the image position relative to the sheet can be determined even when only a part of the sheet is read by the reading device. Thus, the measurement can be easier.

Numerous additional modifications and variations are possible in light of the above teachings. It is therefore to be understood that, within the scope of the appended claims, the disclosure of this patent specification may be practiced otherwise than as specifically described herein. The Image forming apparatus to which various aspects of the present specification are applicable are not limited to the multicolor image forming apparatus shown in FIG. 1 but may monochrome image forming apparatuses, copiers, printers, facsimile machines, or multifunction machines (or MFPs) having these capabilities.

What is claimed is:

1. An image forming apparatus comprising:
   an image forming device to form an image on a recording medium;
   a reading device including an image reading face to read the image, the reading device to measure a position of the image on the recording medium relative to the recording medium with reference to a position measurement reference sheet, the position measurement reference sheet including:
   a plurality of recording medium detection windows formed through the position measurement reference sheet at first positions to measure a position of an end of the recording medium, and a plurality of image detection windows formed through the position measurement reference sheet at second positions to measure a position of the image on the recording medium, the second positions being different from the first positions, the reading device configured to measure the position of the image through the plurality of recording medium detection windows and the plurality of image detection windows; and a controller to calculate the position of the image, the controller including an image position adjuster to adjust the position of the image on the recording medium based on a measurement result obtained by the reading device, wherein the plurality of recording medium detection windows includes:

a first window disposed to overlap a corner of the recording medium;

a second window shifted from the first window in a first direction and coinciding with the first window in a second direction perpendicular to the first direction; and a third window coinciding with the first window in the first direction and shifted from the first window in the second direction, wherein the plurality of image detection windows includes:

a first image window disposed to overlap a corner of the recording medium;

a second image window shifted from the first image window in a first direction and coinciding with the first image window in a second direction; and a third image window coinciding with the first image window in the first direction and shifted from the first image window in the second direction.

2. A method for measuring an image position in an image forming apparatus with a position measurement reference sheet having a plurality of recording medium detection windows and a plurality of image detection windows, the method comprising:

forming, with an image forming device, an adjustment image on a recording medium;

reading, with a reading device, the position measurement reference sheet and the adjustment image on the recording medium placed one above the other, from a side of the position measurement reference sheet;

detecting a density change in reading through the plurality of recording medium detection windows and a density change in reading through the plurality of image detection windows;

detecting a boundary between the recording medium and a background based on the density change in reading through the plurality of recording medium detection windows; and detecting a boundary between the adjustment image and an image background in the recording medium based on the density change in reading through the plurality of image detection windows, wherein the plurality of recording medium detection windows includes:

a first window disposed to overlap a corner of the recording medium;

a second window shifted from the first window in a first direction and coinciding with the first window in a second direction perpendicular to the first direction; and a third window coinciding with the first window in the first direction and shifted from the first window in the second direction, wherein the plurality of image detection windows includes:

a first image window disposed to overlap a corner of the recording medium;

a second image window shifted from the first image window in a first direction and coinciding with the first image window in a second direction; and a third image window coinciding with the first image window in the first direction and shifted from the first image window in the second direction.

3. The method according to claim 2, wherein the adjustment image is sized to partly overlay with each of the first window, the second window, and the third window of the plurality of recording medium detection windows.

* * * * *